United States Patent [19]

Hellström et al.

[11] 3,949,178

[45] Apr. 6, 1976

[54] ELECTRET DEVICE HAVING CHARGE MAINTAINED BY RADIOACTIVITY

[75] Inventors: Sten Hellström, Djurhamn; Rolf Bertil Göran Jönsson, Tyreso, both of Sweden

[73] Assignee: Telefonaktiebolaget L M Ericsson, Stockholm, Sweden

[22] Filed: Oct. 15, 1974

[21] Appl. No.: 514,643

[30] Foreign Application Priority Data

Oct. 24, 1973 Sweden .............................. 7314422

[52] U.S. Cl. 179/111 E; 178/DIG. 10; 179/100.41 B; 307/88 ET; 29/592; 427/35

[51] Int. Cl.[2] ...................... H04R 19/00; H01G 7/02

[58] Field of Search................ 179/111 E, 100.41 B; 307/88 ET; 178/DIG. 10; 29/592; 117/220; 250/472; 317/262 F

[56] References Cited

UNITED STATES PATENTS

| | | | |
|---|---|---|---|
| 3,095,476 | 6/1963 | Crownover | 179/1 R |
| 3,123,511 | 3/1964 | Coleman | 29/592 |
| 3,448,348 | 6/1969 | Stadler | 317/262 F |
| 3,644,605 | 2/1972 | Sessler et al. | 307/88 ET |

*Primary Examiner*—Kathleen H. Claffy
*Assistant Examiner*—George G. Stellar
*Attorney, Agent, or Firm*—Hane, Baxley & Spiecens

[57] ABSTRACT

An electret device has a dielectric layer containing electret charges and a radioactive layer on one of the surfaces of the dielectric layer.

8 Claims, 2 Drawing Figures

ELECTRET DEVICE HAVING CHARGE MAINTAINED BY RADIOACTIVITY

The invention relates to an electret device comprising a dielectric layer containing electret charges.

The U.S. Pat. No. 3,711,941 describes a method for the manufacture of electret transducers. The method includes the step of irradiating a dielectric layer with an electron beam that has a current density between 0.01 and 0.1$\mu$A/cm$^2$ and an energy between 5 and 40 KeV. to produce electret charges in the dielectric layer. The discharging of these charges is expected to be very slow, especially at a uniform charge distribution.

It is, however, a well-known fact that the discharging of electret charges in a dielectric layer is sensitive to environmental factors such as heat, humidity and air pollutants. In all the electret devices heretofore known a temporary stress in the environment can cause a rapid discharge which is essentially irreversible and thus results in a reduced life time for the electret device as compared to its life time when the environment is controlled.

The invention relates to an electret device that has the advantageous feature that a rapid discharge process caused by a temporary stress in the environment is reversible.

Figure 1:
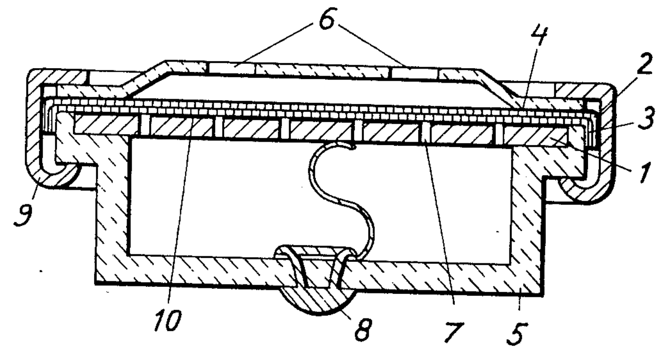
Figure 2:
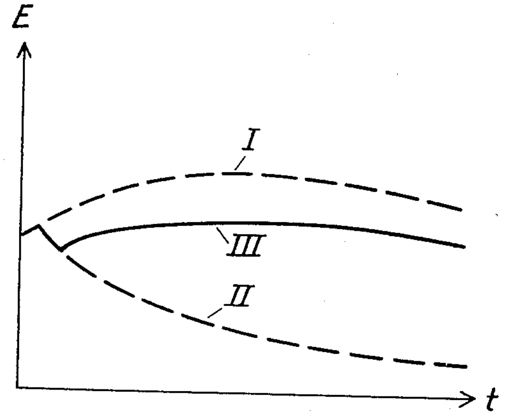

The invention will now be described in detail with reference to the accompanying drawing in which FIG. 1 shows a cross-sectional view of an electret microphone comprising an electret device according to the invention and FIG. 2 shows an electret voltage as a function of time for an electret device according to the invention.

FIG. 1 shows a cross section of an electret microphone comprising a metallic base plate 1 and an overlying diaphragm 2 forming a first and a second electrode, respectively, in the electret microphone, and a second diaphragm 3 consisting of an electret film located between the base plate 1 and the diaphragm 2. The diaphragms 2 and 3 are so arranged that they function in cascade when actuated upon by acoustic waves. They consist of a polyester film and a Teflon film which are provided with a metallized layer 4 and with electret charges, respectively, in a known manner. Owing to the low coefficient of thermal expansion of the polyester film, approx. 27 $\times 10^{-6}$/°C, the sensitivity of the electret microphone is relatively independent of the temperature, while the very high resistivity, $2 \times 10^{16}\Omega$m, of the Teflon film ensures a very slow discharge process for the electret charges as long as the environment of the electret microphone is controlled.

The electret microphone has an insulating casing 5 with acoustic openings 6. The metallic base plate 1 is formed in a known manner so as to have air channels 7. The intention is that acoustic waves enter through the openings 6 and actuate the diaphragms 2 and 3 functioning in cascade, whereupon a signal voltage is generated between an electrical terminal 8 connected to the metallic base plate 1 and another electrical terminal 9 connected to the metallized surface layer 4 of the diaphragm 2. The terminal 8 has a part formed as a spring resting against the base plate 1.

An electret device according to the invention is formed by providing the base plate 1 with a beta radiating surface layer 10 of tritium in order to inject electrons into the overlying diaphragm 3 and in this way maintain the electret charges stored therein as it will be explained in detail below.

FIG. 2 shows an electret voltage E featured by the electret device of the invention as function of time. In a controlled factory environment the electret voltage E increases according to curve 1 with an increasing time *t* towards a maximum approximately at the half-life time of tritium, 12.3 years. Curve II shows how the electret voltage E decreases rapidly when the electret microphone of FIG. 1 is for example stored for a time in a harsh environment. The discharge process according to curve II is, however, converted into a charge process according to curve III when the electret microphone thereafter is installed in an appropriate environment. The electret voltage E increases then quickly during a recovery period and thereafter more slowly towards a maximum approximately at said half-life time of tritium, 12.3 years. The result is that the electret voltage E will remain essentially constant during more than a decade in spite of a period in a harsh environment.

It should be observed that it is not until the electret voltage E has decreased to about 50V from a maximum of for example 500V that the sensitivity of the electret microphone has decreased to such a low value that the life-time of the electret microphone can be considered to be exhausted. If the electret voltage E reaches a maximum after almost a decade, then the life time of the electret microphone will not be exhausted until several decades have passed.

The radioactive intensity of the beta radiating surface layer 10 of the base plate 1, which is required to achieve the time dependence of Fig. 2 for the electret voltage E in the electret device according to the invention, can be calculated in the following way: Apparently the beta radiation must inject a greater charge per unit of time into the diaphragm 3 than what is continuously lost in the latter. In a tough environment 5% of the charge in the diaphragm 3 can be assumed to be lost in 30 days which loss of charge further can be expected to be counteracted with an efficiency of 10% of the charge that the surface layer 10 supplies by means of the beta radiation. In tritium the beta radiation corresponds to one electron per nuclear decay. Starting out from a charge density of, for example, $5.0 \times 10^{-8}$C/cm$^2$ in the diaphragm 3 and knowing the electron charge, $1.6 \times 10^{-19}$ C, the radioactivity X of tritium measured in the unit Curie, equal to $3.7 \times 10^{10}$ nuclear decays per second, that is required to maintain the electret voltage E constant can then be calculated per cm$^2$ in the surface layer 10 according to the relation $$0.05 \cdot 5.0 \times 10^{-8} = 0.1 \cdot 3.7 \times 10^{10} \cdot X \cdot 1.6 \times 10^{-19} \cdot 60 \cdot 60 \cdot 24 \cdot 30$$

From this X = 1.6 $\mu$Ci is obtained. At an overlapping surface of some few cm$^2$ of the surface layer 10 and the diaphragm 3 the practically useful quantity of radioactivity appears to lie between 0.01 and 100 $\mu$Ci.

The electret device according to the invention can be produced in many different embodiments within the scope of the invention and is useful not only in electret microphones but also in measuring instruments such electrometers, in electrostatic engines, air filters, and so on. Other radioactive sources than tritium are conceivable, for example nickel-63. As regards the electret microphone shown in FIG. 1 the beta radiating surface layer 10 can instead of being separated from the diaphragm 3 abut to it as a glued foil or be diffused under one of its surfaces. Eventually it can be inserted between the two diaphragms 2 and 3. At a conventional thickness of between 12.7 and 25.4 $\mu$m of the diaphragm 3 and for a radioactivity of between 0.01 and 100 $\mu$Ci of the beta radiating surface layer 10 the energy spectrum of the latter should have a maximum lying between 5 and 200 keV.

In a special embodiment of the electret device according to the invention, the long-term regulation of the electret voltage according to FIG. 2 by means of a radioactive source with a long half-life time is supplemented with a strong neutralization of the influence of the environment on the electret voltage during a short time interval immediately after the fabrication by including a radioactive source with a half-life time shorter than a year, for example sulphur -35, the half-life time of which is 88 days.

We claim:

1. Electret device, comprising a dielectric layer containing electret charges and means for maintaining the electret charges stored therein comprising a radioactive layer of essentially the beta radiation type located opposite one of the surfaces of the dielectric layer, said radioactive layer having a radioactivity of between 0.01 and 100 $\mu$Ci.

2. Electret device according to claim 1, wherein the radioactive layer has an energy spectrum with a maximum being between 5 and 200 keV.

3. Electret device according to claim 2, wherein the radioactive layer contains tritium.

4. Electret device according to claim 1, wherein the radioactive layer is separated from the surface of the dielectric layer.

5. Electret device according to claim 1, wherein the radioactive layer abuts to the surface of the dielectric layer.

6. Electret device according to claim 1, wherein the radioactive layer is located under the surface of the dielectric layer.

7. An electret microphone comprising a first electrode having a surface with a layer of dielectric material containing electret charges and means for maintaining the electret charges stored therein comprising a second electrode disposed opposite said first electrode, said second electrode having a surface with a layer of radioactive material and facing the surface of said first electrode with the layer of dielectric material, one of said electrodes being movable.

8. Electret microphone of claim 7 wherein said first electrode is movable.

* * * * *